United States Patent [19]
Kozloff et al.

[11] Patent Number: 5,655,736
[45] Date of Patent: Aug. 12, 1997

[54] RETAINING DEVICE FOR AN ELECTRONIC SIGNALLING DEVICE

[76] Inventors: Matthew S. Kozloff; Gale Kozloff, both of 1230 Braeburn Ave., Flossmoor, Ill. 60422

[21] Appl. No.: 461,152

[22] Filed: Jun. 5, 1995

Related U.S. Application Data

[63] Continuation-in-part of Ser. No. 269,081, Jun. 30, 1994, Pat. No. 5,452,874.

[51] Int. Cl.⁶ .................................................. F16M 11/12
[52] U.S. Cl. .................... 248/179.1; 248/181.2; 248/187.1
[58] Field of Search ................ 248/181.1, 181.2, 248/183.3, 179.1, 371, 372.1, 289.11, 222.11, 125.2, 292.12, 292.13, 288.11, 187.1; 273/148 B

[56] References Cited

U.S. PATENT DOCUMENTS

| | | | |
|---|---|---|---|
| Re. 34,120 | 11/1992 | Plahn ................................ 248/206.3 |
| 424,834 | 4/1890 | Suran ............................. 248/183.3 X |
| 520,947 | 5/1894 | Browne .............................. 248/371 |
| 2,246,473 | 6/1941 | Stahlecker ..................... 248/289.11 X |
| 3,737,130 | 6/1973 | Shiraishi .............................. 248/181.1 |
| 3,822,049 | 7/1974 | Saunders ............................. 248/223.4 |
| 4,494,754 | 1/1985 | Wagner, Jr. ........................ 248/918 X |
| 4,573,682 | 3/1986 | Mayon ................................. 273/148 B |
| 4,630,823 | 12/1986 | Grant .................................. 273/148 B |
| 4,648,572 | 3/1987 | Sokol ................................. 248/206.2 |
| 4,836,482 | 6/1989 | Sokol ................................. 248/206.3 |
| 4,896,855 | 1/1990 | Furnish .............................. 248/206.3 |
| 4,915,333 | 4/1990 | Bolondi .............................. 248/181.1 |
| 4,984,760 | 1/1991 | Cohn et al. .......................... 248/126 |
| 5,020,754 | 6/1991 | Davis et al. ........................ 248/206.3 |
| 5,207,791 | 5/1993 | Scherbarch ........................ 273/148 B |
| 5,279,488 | 1/1994 | Fleming ......................... 248/181.1 X |
| 5,358,141 | 10/1994 | Carlson et al. ................. 248/181.1 X |

*Primary Examiner*—Korie Chan
*Attorney, Agent, or Firm*—Gerald S. Geren

[57] ABSTRACT

A retaining and paneling stand for an electronic signalling device such as a beeper. The stand includes a grasping/carrier section for receiving and securely holding the beeper. A pedestal is provided for supporting the grasping/carrier section and for placement on a surface. A positioning head is also provided for interconnecting the grasping/carrier section and the pedestal. The positioning head may be of a ball-and-socket type or of a biased serrated edge type.

2 Claims, 1 Drawing Sheet

RETAINING DEVICE FOR AN ELECTRONIC SIGNALLING DEVICE

This application is a continuation-in-part of U.S. patent application Ser. No. 08/269,081 filed Jun. 30, 1994, now U.S. Pat. No. 5,452,874.

BACKGROUND OF THE INVENTION

This invention relates to an improved retaining device for an electronic signalling device which is sometimes referred to as a beeper.

Electronic signalling devices are usually flat and box-like in shape and have a pair of ends, a pair of sides and two face surfaces. A clip may be provided on one face for securing the device to a persons belt or similar article. These devices commonly have a display at one end, where a number or similar characters are displayed.

In simple terms, a transmitter sends a signal to the so called beeper, which is then translated into a series of readable numbers or characters on the display, an audible tone or the like.

The beeper wearer sometimes uses the device at the same time as operating a vehicle. Thus, the user must move his eyes and attention from the road and operating the vehicle to the beeper display and visa versa.

The invention disclosed in the above-identified application is for a retainer constructed to hold a beeper in a cradle-like device on the dashboard of a car so as to more easily obtain signalling information and minimize distractions.

However, in some devices the display is associated with one of the faces rather than the end. Moreover, it has been determined to be desirable to be able to position the beeper relative to the user, and to selectively permit the face display or the end display to be easily viewed. In other words, it has been found to be desirable to rotate and/or angularly position the beeper and display for easier and more flexible viewing whether of the end or face display.

Thus, it is an object of this invention to provide a beeper retainer stand which is selectively movable and angularly positionable so as to selectively position a beeper mounted on the retainer stand.

This and other objects of this invention will become apparent from the following disclosure and appended claims.

SUMMARY OF THE INVENTION

There is provided by this invention a retaining device for a beeper or electronic signalling device which meets the foregoing object and the resolves drawbacks discussed hereinbefore.

The retainer includes a stand having a clip grasping section for grasping the clip on a beeper and thus carrying or supporting the beeper, a pedestal for mounting the stand on a vehicle dash board or the like and a positioning head connecting the pedestal and grasping section for tilting and selectively positioning a beeper held in the grasping section.

Thus, the beeper can be positioned for end or face reading and at a convenient viewing position.

The positioning head may be a ball-and-socket type of joint or a serrated edge connection, where the edges which are urged into engagement by a spring biasing device.

DESCRIPTION OF THE PREFERRED EMBODIMENT

Figure 1:
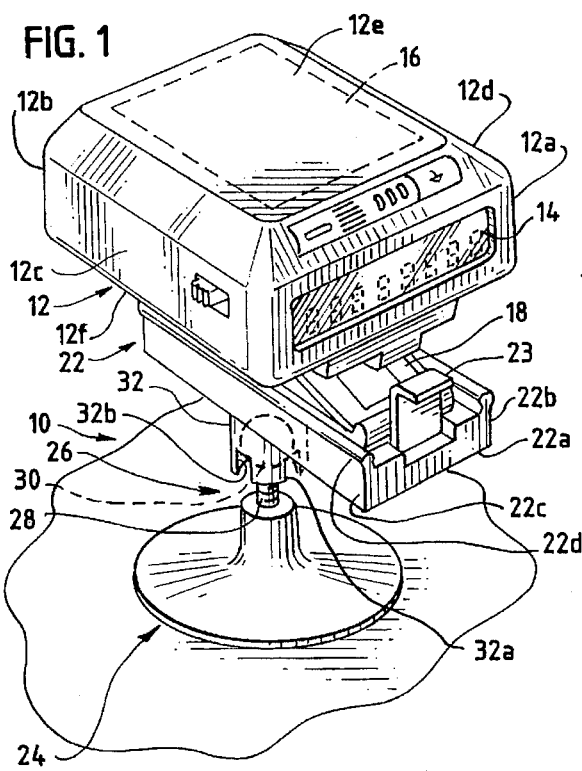
FIG. 1 is a perspective view showing a beeper mounted to a retaining stand which includes a grasping section, a pedestal and a ball and socket positioning head.
Figure 2:
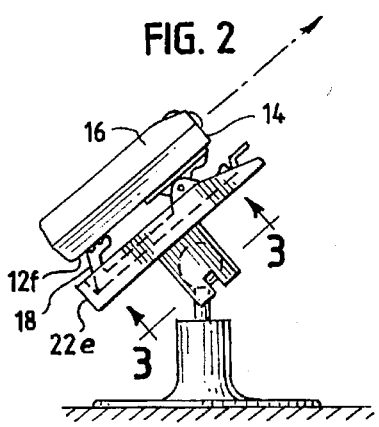
FIG. 2 is a side elevational view of a beeper and stand as in FIG. 1 positioned at an upward angle for end reading.

Referring to FIG. 1 there is shown a beeper carrying stand 10 generally with a beeper 12 generally mounted thereon.

The beeper is of a flat box-like or rectangular shape and has top and bottom ends 12a and 12b, two side edges 12c and 12d and two large side faces 12e and 12f. A display 14 is at the top end 12a. A display 16 can be provided at face 12e. A clip 18 secured to the other face 12f.

The stand 10 includes a grasping section 22, a pedestal section 24, and a positioning head 26 which interconnects the sections and permits relative selective positioning thereof.

The Grasping Section

The beeper grasping or carrying section 22 (which grasps the clip and this supports the beeper) is an elongated and rectangularly shaped member having a bottom wall 22a and a pair of upstanding side walls or rails 22b and 22c, each of which terminate in a shoulder-like edge formation, such as 22d. The grasping or carrying section also includes an upstanding back wall 22e which is of a similar height to the side walls and joins the side walls. A latch 23 biased to the upward or latching position, is at the front end of the section and prevents the beeper keeper clip from sliding from a retained position.

In use the latch 23 is depressed and the beeper clip is slid into the grasping section between the side walls, along the bottom to the back wall 22e. The latch is released or raised and the beeper is positioned between the side walls, back wall and latch. The clip is retained between the bottom wall and a side wall shoulder formation such as 22d on each side wall. The clip is thus prevented from lifting or sliding out of the carrying section and the beeper positioned.

The Ball and Socket Positioning Head

The ball and socket connection 26 includes a ball formation associated with the pedestal and a socket formation associated with the carrying section. The ball formation includes a slender upstanding post 28 having one end embedded in the pedestal and a ball 30 on the other end.

Figure 3:
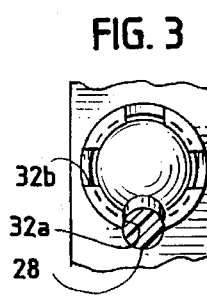
FIG. 3 is a sectional view taken along line 3—3 of FIG. 2 showing the ball and socket construction.

The socket 32 is a collar or tube-like member which extends downwardly from the carrying section 22 and is constructed to have a hollow center or inside diameter, so as to receive the ball formation 30. The end of the socket has at least four slots cut therein such as 32a and 32b, which are shaped and constructed to receive and engage the post 28 for use in positioning the beeper. This engagement can be seen in FIG. 3 where the post 28 is positioned in one of the slots such as 32a. In this position the beeper top end 12a and the display 14 are tilted upwardly for viewing.

Figure 4:
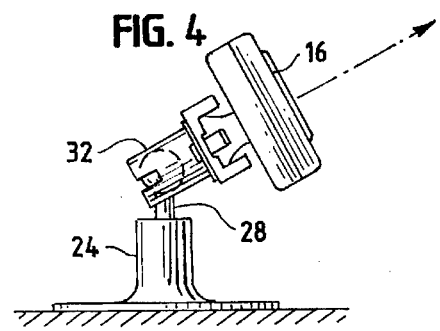
FIG. 4 is a view similar to FIG. 2 showing a beeper face positioned for viewing.
Figure 5:
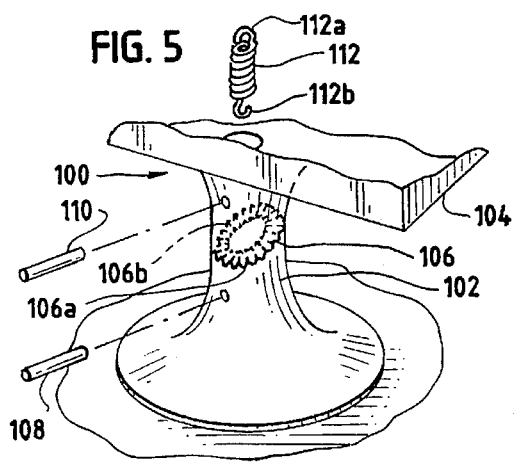
FIG. 5 is a perspective view which is fragmentary and partially exploded and shows the serrated connection system and biasing spring mechanism for connecting the pedestal and grasping section.

If the beeper is of the type where the display 16 is on the face 12e, the collar 32 is rotated and then the appropriate collar notch and the post are engaged to position the beeper as shown in FIG. 4.

The Serrated Edge and Biased Positioning Head

In another embodiment the stand 100 generally includes a pedestal 102 and a carrying section 104 which are joined at an elliptically-shaped, angularly arranged, serrated edge or jagged interface 106. The interface is formed from a serration 106a on the pedestal and a serration 106b on the carrying section.

The pedestal and stand are biased together at the serration interface 106 by a spring biasing system. The biasing system includes a pin 108 in the pedestal and a pin 110 in the carrying section. A tension spring 112 is provided which has hook ends 112a and 112b for engaging the pins. The spring draws the pedestal and carrying sections together and the serrated edges into engagement.

Otherwise, the section 104 acts to engage the clip and carry the beeper in the same manner as previously described relative to section 22. The beeper is also the same.

Figure 6:
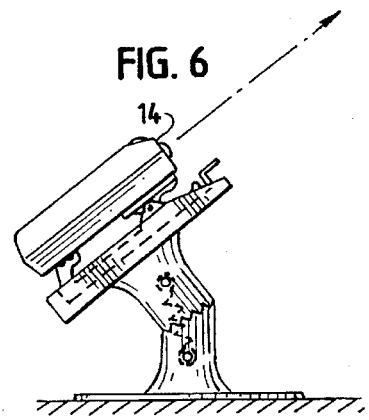
FIG. 6 is similar to FIG. 2 showing the beeper tilted upwardly for end viewing.

If the top end 12a and display 14 are to be viewed, the pedestal and carrier are separated, moved to the proper position, released and then the serrated edges engage each other. Under the influence of the spring bias, the pedestal and the carrier are repositioned and the serrations engage as shown in FIG. 6.

Figure 7:
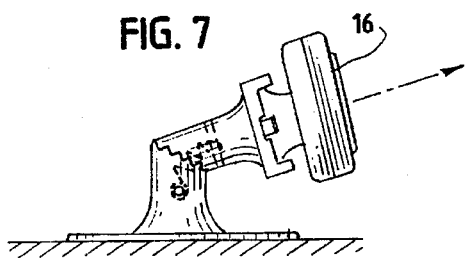
FIG. 7 is similar to FIG. 4 and shows the beeper face titled upwardly.

If the face 16 and display associated therewith are to be positioned toward the viewer, the carrier and pedestal are separated, positioned as shown in FIG. 7 and then brought back together.

Various changes and modifications can be made to the embodiments disclosed herein without departing from the spirit and scope of this invention.

We claim:

1. A retaining and positioning stand for use with an electronic signalling device which includes an attachment clip, said stand including:

a grasping/carrier section for receiving and securely holding the signalling device, a pedestal for supporting the grasping/carrier section and for placement on a surface, and a positioning head for inter-connection of the grasping/carrier section and the pedestal and for selectively positioning the grasping/carrier section relative to the pedestal, wherein the grasping/carrier section includes:

an elongated bottom wall, a pair of sidewalls extending from bottom wall and spaced apart a distance effective to receive the clip signalling device, a back wall extending from the bottom wall and constructed to engage the clip on the signalling device, and a latch associated with the bottom wall positioned at the forward end thereof to engage the clip, wherein the positioning head includes an angularly positioned serration formation which comprises:

a first serrated edge associated with the pedestal, a second serrated edge associated with the grasping/carrier section and matingly shaped to engage the first serrated edge, and a biasing system for urging the serrated edges together and into engagement for selected positioning of the grasping/carrier section relative to the pedestal, and wherein the biasing system includes:

a securement point associated the pedestal, a securement point associated with the carrier section, and a tension spring having a pair of ends, each attached to a respective one of said securement points and acting to draw the serrated edges into engagement.

2. A retaining and positioning stand for use with an electronic signalling device which includes an attachment clip, said stand including:

a grasping/carrier section for receiving and securely holding a signalling device;

a pedestal for supporting the grasping/carrier section and for placement on a surface;

a positioning head for inter-connection of the grasping/carrier section and the pedestal and for selectively positioning the grasping/carrier section relative to the pedestal;

wherein the grasping/carrier section includes:

an elongated bottom wall;

a pair of side walls extending from the bottom wall and spaced apart a distance effective to receive the clip on the signalling device;

a back wall extending from the bottom wall and constructed to engage an end of the clip on the signalling device; and a latch associated with the bottom wall and positioned at the forward end thereof to engage a forward end of the clip;

wherein the positioning head includes an angularly positioned serration formation which comprises:

a first serrated edge associated with the pedestal;

a second serrated edge associated with the grasping/carrier section and matingly shaped to engage the first serrated edge; and a biasing construction for urging the serrated edges together and into engagement for selective positioning of the grasping/carrier section relative to the pedestal;

wherein said biasing construction permits separation of the serrated edges under the influence of a biasing force; and wherein the biasing construction includes:

a securement point associated with the pedestal;

a securement point associated with the carrier section; and a tension spring having a pair of ends, each end attached to a respective one of the securement points and acting to draw the serrated edges into engagement.

* * * * *